(12) United States Patent
Soria et al.

(10) Patent No.: US 11,111,879 B2
(45) Date of Patent: Sep. 7, 2021

(54) THRUST REVERSER PIVOT DOOR WITH EXTENDED FORWARD EDGE

(71) Applicant: Rohr Inc., Chula Vista, CA (US)

(72) Inventors: Christian Soria, La Mesa, CA (US); Brian A Sherman, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 229 days.

(21) Appl. No.: 15/870,594

(22) Filed: Jan. 12, 2018

(65) Prior Publication Data

US 2019/0218999 A1    Jul. 18, 2019

(51) Int. Cl.
| | |
|---|---|
| *F02K 1/70* | (2006.01) |
| *F02K 1/54* | (2006.01) |
| *F02K 3/06* | (2006.01) |
| *F02K 1/09* | (2006.01) |
| *F02K 1/60* | (2006.01) |

(52) U.S. Cl.
CPC .................. *F02K 1/70* (2013.01); *F02K 1/09* (2013.01); *F02K 1/54* (2013.01); *F02K 1/60* (2013.01); *F02K 3/06* (2013.01); F05D 2220/327 (2013.01)

(58) Field of Classification Search
CPC ... F02K 1/60; F02K 1/605; F02K 1/62; F02K 1/625; F02K 1/70; F02K 1/72; F02K 1/78; F02K 1/80; F01D 25/243; F01D 25/24

See application file for complete search history.

(56) References Cited

U.S. PATENT DOCUMENTS

| | | | |
|---|---|---|---|
| 3,739,582 A * | 6/1973 | Maison | F02K 1/70 60/226.2 |
| 4,030,291 A * | 6/1977 | Sargisson | F02K 1/70 60/226.2 |
| 5,970,704 A | 10/1999 | Lardy et al. | |
| 6,402,092 B1 * | 6/2002 | Jean | F02K 1/70 244/110 B |
| 6,546,715 B1 * | 4/2003 | Blevins | F02K 1/566 239/265.29 |
| 9,670,876 B2 | 6/2017 | Chandler et al. | |
| 2004/0068978 A1 * | 4/2004 | Lair | F02K 1/763 60/226.2 |
| 2016/0039528 A1 * | 2/2016 | Caruel | F02K 1/64 415/119 |

* cited by examiner

*Primary Examiner* — Andrew H Nguyen
(74) *Attorney, Agent, or Firm* — Snell & Wilmer L.L.P

(57) ABSTRACT

A thrust reverser pivot door may comprise a support structure configured to pivot between a stowed position and a deployed position, and a pivot door outer skin coupled to the support structure, wherein a forward lip of the pivot door outer skin is configured to extend forward of a torque box and overlap the fan case to advantageously increase the overall size or area of the pivot door.

9 Claims, 8 Drawing Sheets

THRUST REVERSER PIVOT DOOR WITH EXTENDED FORWARD EDGE

FIELD

This disclosure relates generally to thrust reversers for gas turbine propulsion systems on aircraft, and more particularly to pivot door thrust reversers.

BACKGROUND

In a typical pivot door thrust reverser, known to those of skill in this art, a pivot door moves to a deployed position, blocking fan duct air and redirecting it to exit the propulsion system in a partially forward direction resulting in reverse thrust. In the deployed position, the pivot door may also extend outward into and disrupting oncoming slip stream air, increasing the overall base drag of the aircraft. The effectiveness of the pivot door in guiding the diverted air forward to generate reverse thrust, and in disrupting slip stream air to increase base drag is a function of its overall size or area.

SUMMARY

A thrust reverser is disclosed, comprising a fixed structure including a torque box, a pivot door mounted on the fixed structure for pivotal movement between a stowed and a deployed position, the pivot door comprising a support structure, a pivot door outer skin coupled to the support structure, wherein a forward lip of the pivot door outer skin is configured to extend forward of the torque box when the thrust reverser pivot door is in a stowed position.

In various embodiments, the fixed structure also includes a thrust reverser outer skin, and the pivot door outer skin is configured to be flush with a the thrust reverser outer skin when the thrust reverser pivot door is in the stowed position.

In various embodiments, the forward lip of the pivot door outer skin is configured to be flush with a fan cowl in response to the thrust reverser pivot door being in the stowed position.

In various embodiments, the pivot door outer skin is configured to pivot with the support structure.

In various embodiments, the thrust reverser further comprises a support ring disposed forward of the torque box, wherein the forward lip is supported by the support ring when the thrust reverser pivot door is in the stowed position.

In various embodiments, the support ring is coupled to at least one of the torque box or a fan case.

A nacelle is disclosed, comprising a fan cowl configured to surround a fan case, a thrust reverser disposed aft of the fan cowl, comprising a thrust reverser pivot door, comprising a pivot door outer skin having a forward lip overlapping the fan case, wherein the thrust reverser pivot door is configured to pivot between a stowed position and a deployed position.

In various embodiments, the nacelle further comprises a torque box disposed at a forward end of the thrust reverser, wherein the forward lip of the pivot door outer skin extends in a forward direction past the torque box when the thrust reverser pivot door is in the stowed position.

In various embodiments, the nacelle further comprises a support ring disposed forward of the torque box, the forward lip supported by the support ring when the thrust reverser pivot door is in the stowed position.

In various embodiments, the support ring is disposed radially outward from and axially in line with the fan case.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

In a typical pivoting door-style thrust reverser, a pivot door moves to a deployed position, blocking and redirecting fan duct air out of the propulsion system in a generally forward direction generating reverse thrust. In the deployed position, the pivot door may also extend outward into oncoming slip stream air, increasing the overall base drag of the aircraft. The total braking force of a pivot door reverser is a function of both the reverse thrust force and the incremental base drag force. The total braking force of a pivot door thrust reverser may be limited by the physical size or area of the pivot door. Typically, the maximum potential physical area of the pivot door is limited or bound by the position of the split line between the thrust reverser and the fan cowl in the forward direction, and the shape and thickness of the aft end of the thrust reverser in the aft direction.

Figure 1:
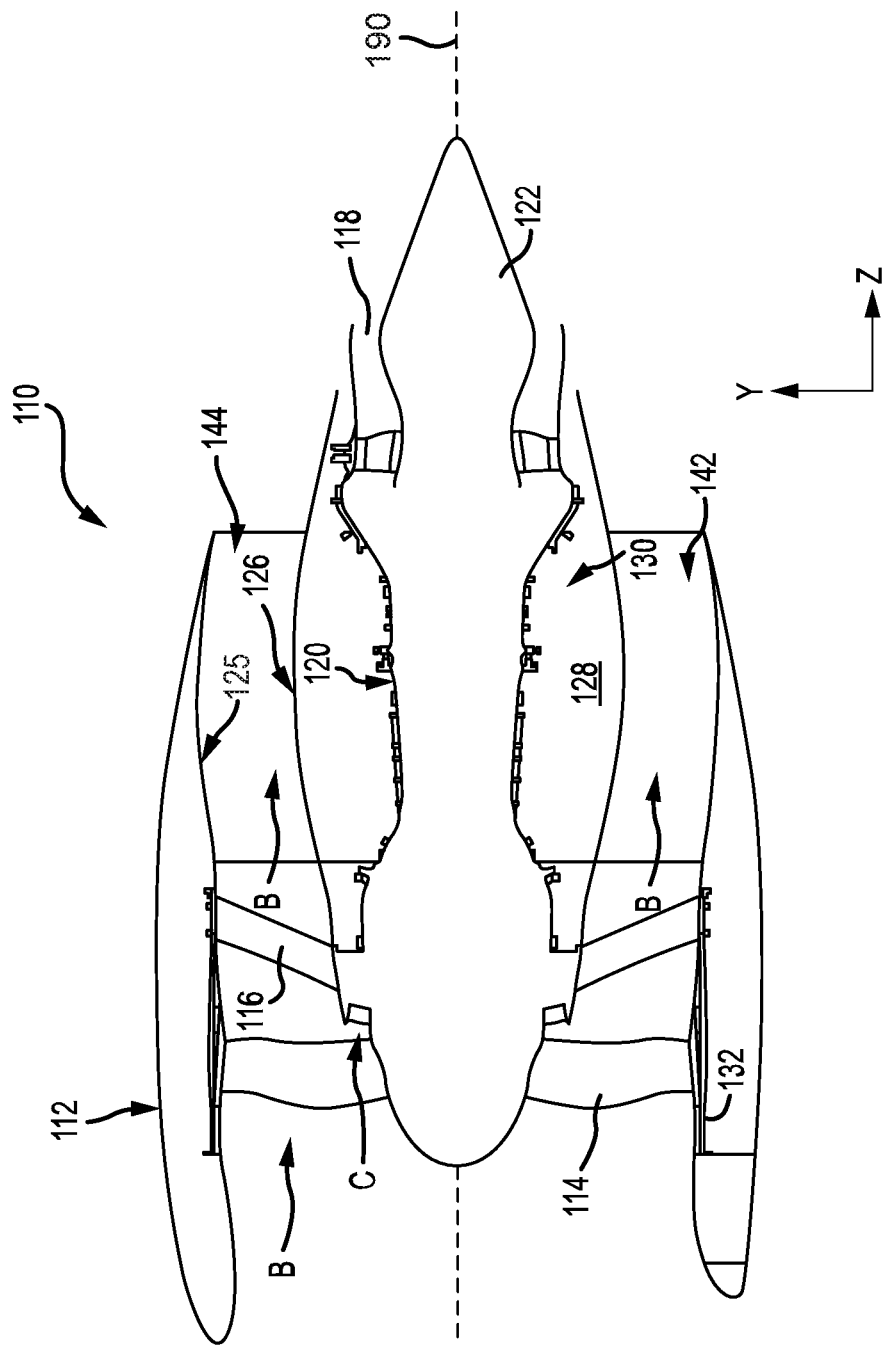
FIG. 1 illustrates a gas turbine engine, in accordance with various embodiments.

FIG. 1 illustrates a schematic view of a gas turbine engine, in accordance with various embodiments. XYZ-axes are provided for ease of illustration. Gas turbine engine 110 may include core engine 120. Core air flow C flows through core engine 120 and is expelled through exhaust outlet 118 surrounding tail cone 122.

Core engine 120 drives a fan 114 arranged in a bypass flow path B. Air in bypass flow-path B flows in the aft direction (z-direction) along bypass flow-path B. At least a portion of bypass flow path B may be defined between the thrust reverser's outer fixed structure 125 and its inner fixed structure (IFS) 126. Fan case 132 may surround fan 114. Multiple guide vanes 116 may extend radially between core engine 120 and fan case 132 to support the fan case. Fan case 132 may be surrounded by fan cowl 112. Fan 114 may rotate about an engine centerline axis 190.

Upper bifurcation 144 and lower bifurcation 142 may extend radially between the thrust reverser's outer fixed structure 125 and IFS 126 in locations opposite one another to accommodate engine system connections such as electrical wires, compressed air ducts, lube oil and fuel lines, etc.

Inner fixed structure 126 surrounds core engine 120 and helps define core compartment 128 around the engine. Various components attached to and surrounding the engine may be present in core compartment 128 such as fluid conduits and/or compressed air ducts, for example.

Figure 2A:
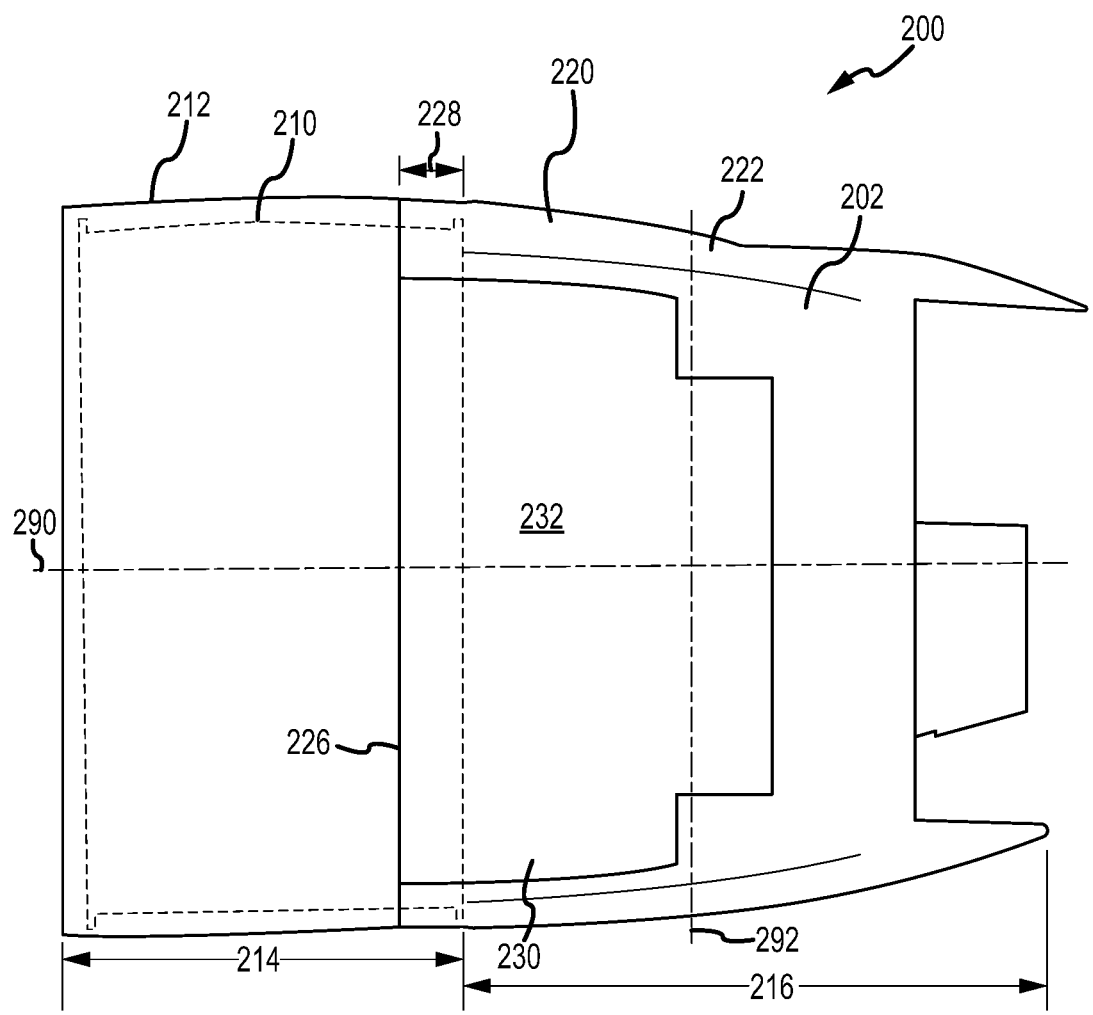
FIG. 2A illustrates a side view of a fan cowl and a thrust reverser having an extended pivot door outer skin, in accordance with various embodiments.

With reference to FIG. 2A, a portion of a nacelle 200 is illustrated, in accordance with various embodiments. Nacelle 200 may include a nacelle outer skin 202. Nacelle outer skin 202 may comprise the outer skin of a fan cowl 212, a thrust reverser outer skin 222, and a pivot door outer skin 232. The outer skin of fan cowl 212, thrust reverser outer skin 222, and pivot door outer skin 232 may be substantially flush with respect to one another to form an aerodynamic surface when in the stowed configuration for normal flight. Nacelle outer skin 202 may be formed of metal and/or fiber reinforced polymer (composite) components.

In various embodiments, thrust reverser 220 may include a thrust reverser pivot door 230. Pivot door 230 may pivot about a hinge line 292. Pivot door 230 may be made of elements and structures constructed out of metals, such as steel alloy, stainless steel, titanium, aluminum, or any other metal, and/or composites. Hinge line 292 may be normal or approximately normal to nacelle centerline axis 290. A forward lip 226 of pivot door outer skin 232 may extend over fan case 210, which is further forward than is known in the prior art. Support structure for forward lip 226 of pivot door outer skin 232 may likewise extend over fan case 210. For example, fan case 210 may comprise an axial dimension 214. Forward lip 226 may extend over fan case 210 by an axial dimension 228. In this regard, thrust reverser outer skin 222 may overlap fan case 210. In FIG. 2A, both the thrust reverser outer skin 222 and the pivot door outer skin 232 are illustrated as overlapping the fan case, as another option it is contemplated that only the pivot door outer skin 232 may overlap the fan case and extend forward beyond the forward edge of the thrust reverser outer skin 222. In such a design, the fan cowl 212 may comprise a cutout having a geometry which is complementary to the geometry of extended forward lip 226 of pivot door outer skin 232. Thrust reverser 220 may comprise an axial dimension 216 from a torque box to a nozzle exit.

Figure 2B:
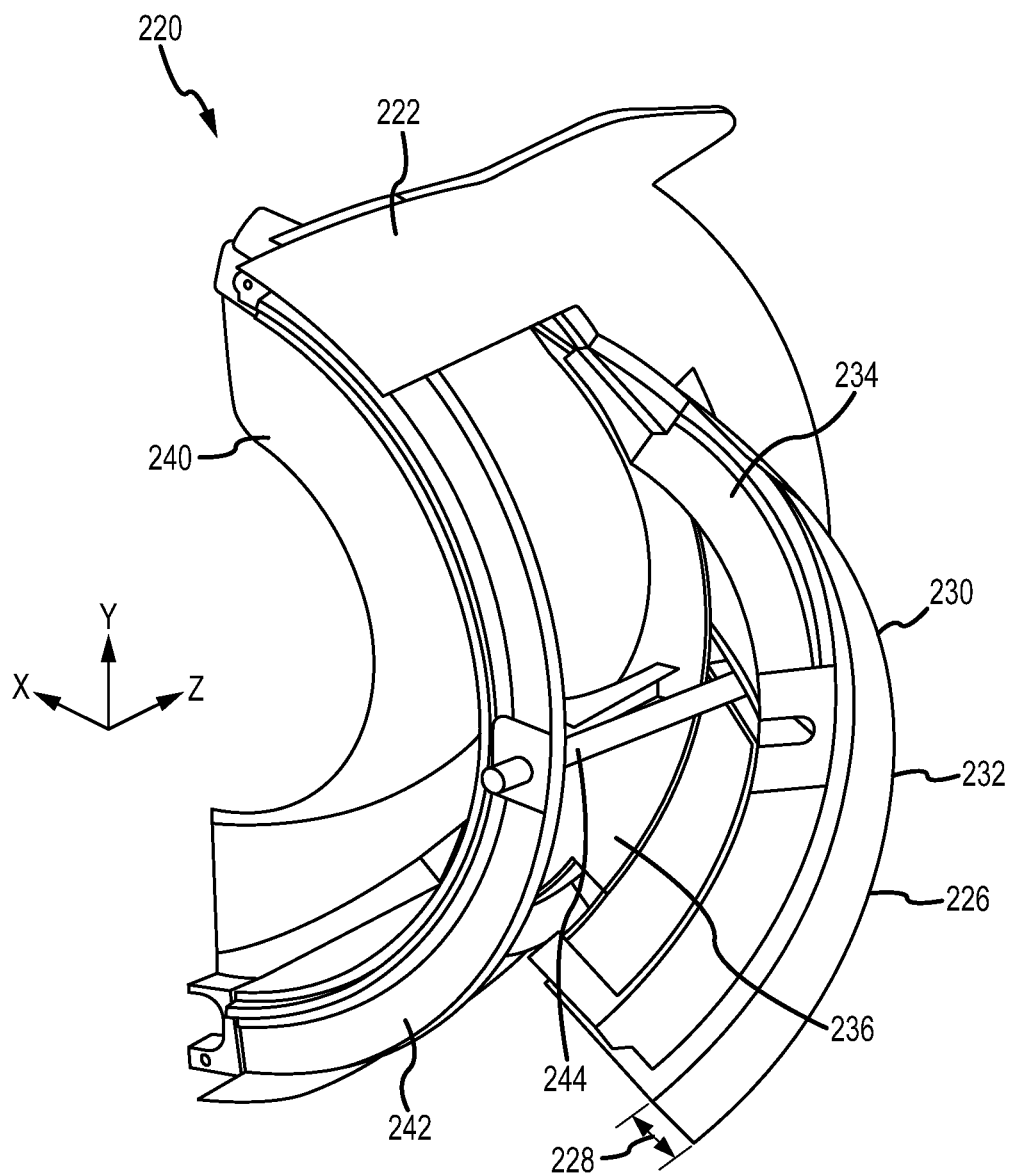
FIG. 2B illustrates a perspective view of the thrust reverser of FIG. 2A with a pivot door in a deployed position, in accordance with various embodiments.

With respect to FIG. 2B, elements with like element numbering, as depicted in FIG. 2A, are intended to be the same and will not necessarily be repeated for the sake of clarity.

With reference to FIG. 2B, a perspective view of thrust reverser 220 with pivot door 230 in a deployed position is illustrated, in accordance with various embodiments. Thrust reverser 220 may include an inner fixed structure 240. Inner fixed structure 240 may be disposed radially inward from pivot door 230. Inner fixed structure 240 may comprise a shaped panel. Thrust reverser 220 may include a torque box 242. Torque box 242 may be curved to fit around the engine and constitutes a beam like structure to provide stiffness against torsional and other forms of bending. Torque box 242 may be disposed at a forward end of thrust reverser 220. Thrust reverser outer skin 222 may be supported by torque box 242. In various embodiments, torque box 242 may be constructed from metal structures and components and/or composites.

In various embodiments, an actuator 244 may be coupled between torque box 242 and pivot door 230. Actuator 244 may be configured to retract and/or extend to move pivot door 230 between a stowed position (see FIG. 2A) and a deployed position (see FIG. 2B). Although illustrated as having a single actuator in the accompanying figures, it is contemplated that pivot door 230 may have two actuators 244 or more, or actuators mounted in different locations than is illustrated.

In various embodiments, pivot door 230 may comprise a support structure 234. Pivot door outer skin 232 may be coupled to support structure 234. Pivot door 230 may comprise a pivot door inner skin 236. Pivot door inner skin 236 may be coupled to support structure 234. Support structure 234 may pivot between the stowed position and the deployed position. Pivot door inner skin 236 and pivot door outer skin 232 may pivot with support structure 234.

Figure 2C:
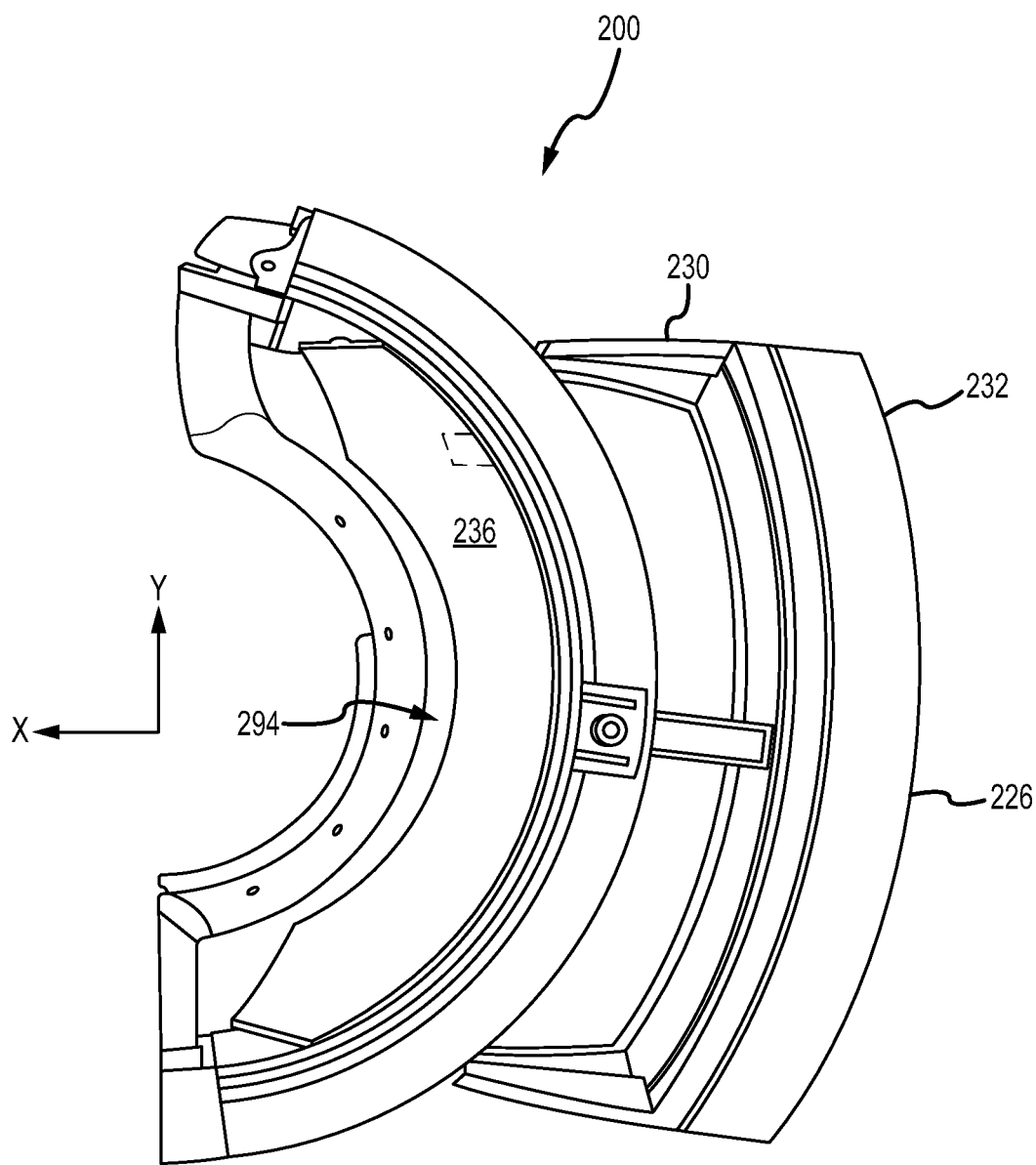
FIG. 2C illustrates an axial view of the thrust reverser of FIG. 2B with the pivot door in the deployed position, in accordance with various embodiments.

With reference to FIG. 2C, an axial view of thrust reverser 220 in a deployed position is illustrated, in accordance with various embodiments. In the deployed position, pivot door inner skin 236 may extend into a bypass duct 294 between the thrust reverser's inner fixed structure and outer fixed structure. Pivot door inner skin 236 may block and divert bypass air from bypass duct 294. Pivot door outer skin 232 may aid in channeling and directing the diverted bypass air from bypass duct 294 radially outward and forward to generate the reverser thrust. With an extended forward lip 226, pivot door outer skin 232 may have an increased overall size or area, thereby improving its performance in channeling and directing the diverted bypass air. Note that the extension of forward lip 226 to overlap the fan case 210 increases the pivot door's performance without increasing the overall axial dimension of the thrust reverser inner or outer fixed structure.

Figure 3A:
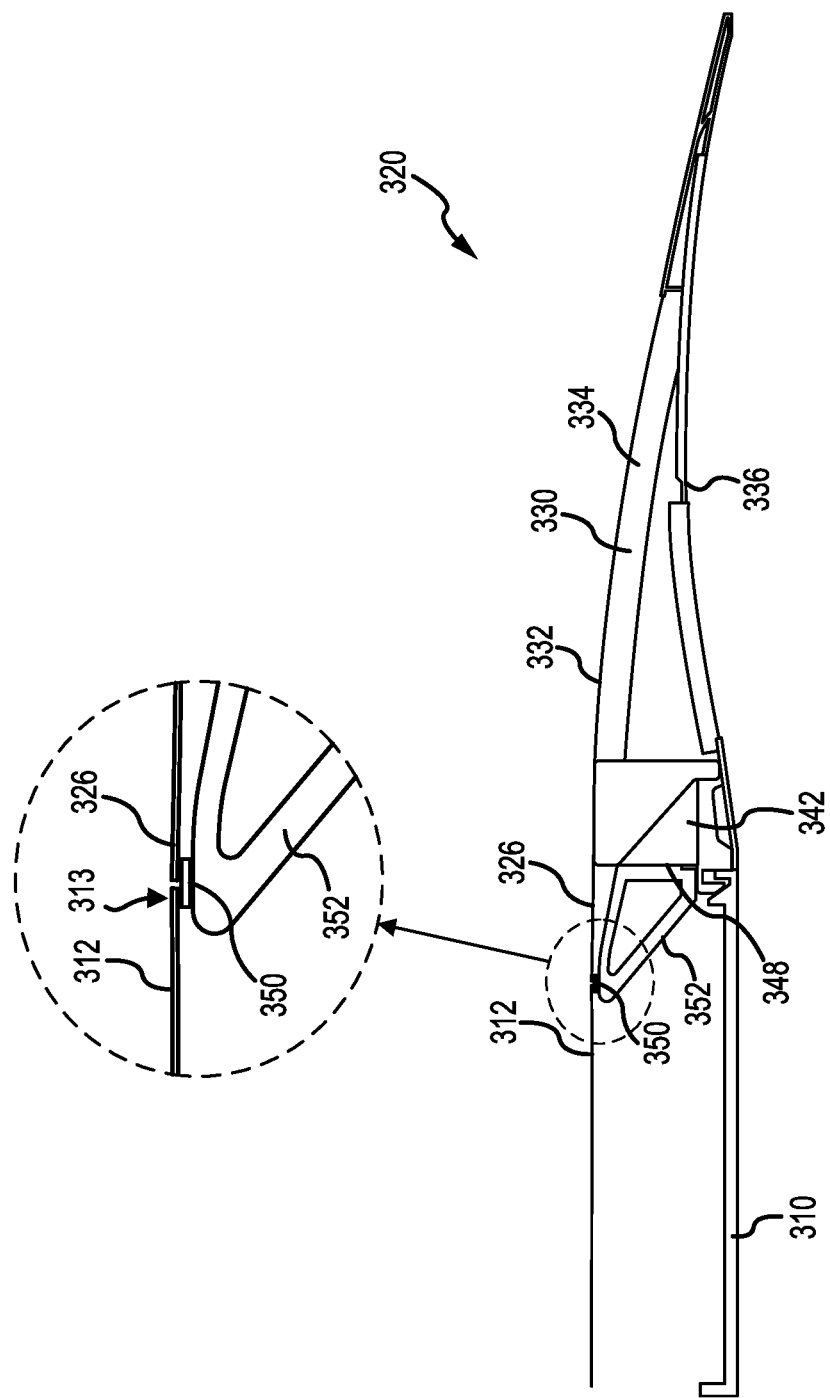
FIG. 3A illustrates a cross-section view of a thrust reverser having a support ring coupled to a torque box, with the pivot door in a stowed position, in accordance with various embodiments.

With reference to FIG. 3A, a cross-section view of a portion of a thrust reverser 320 along with a fan cowl 312 and a fan case 310 is illustrated, in accordance with various embodiments. Thrust reverser 320 may include a thrust reverser pivot door 330 and a torque box 342. In various embodiments, thrust reverser 220 of FIG. 2A through FIG. 2C may be similar to thrust reverser 320. Pivot door 330 may include a pivot door outer skin 332, a support structure 334, and a thrust reverser inner skin 336. In various embodiments, thrust reverser inner skin 336 may be coupled to a proximal side of support structure 334. In various embodiments, pivot door outer skin 332 may be coupled to a distal side of support structure 334. Support structure 334 may be disposed aft of torque box 342.

In various embodiments, thrust reverser 320 may further include a support ring 350. Forward lip 326 may extend past, in the forward direction (i.e., the negative z-direction), a forward surface 348 of torque box 342. Forward lip 326 may land upon, i.e. be supported by support ring 350 when the pivot door 230 is in the stowed position. Support ring 350 may be disposed radially inward from forward lip 326. The aft edge of fan cowl 312 may also land upon, i.e. be supported by, support ring 350. Stated differently, the aft lip 313 of fan cowl 312 may also land upon, i.e. be supported by, support ring 350. Fan cowl 312 and forward lip 326 may be positioned flush in an aerodynamic sense relative to each other on support ring 350. In various embodiments, support ring 350 may be coupled to torque box 342. Support ring 350 may be coupled to torque box 342 via one or more attachment features 352. Attachment feature 352 may comprise a gusset coupled between torque box 342 and support ring 350. Attachment feature 352 may be coupled to forward surface 348 of torque box 342.

Figure 3B:
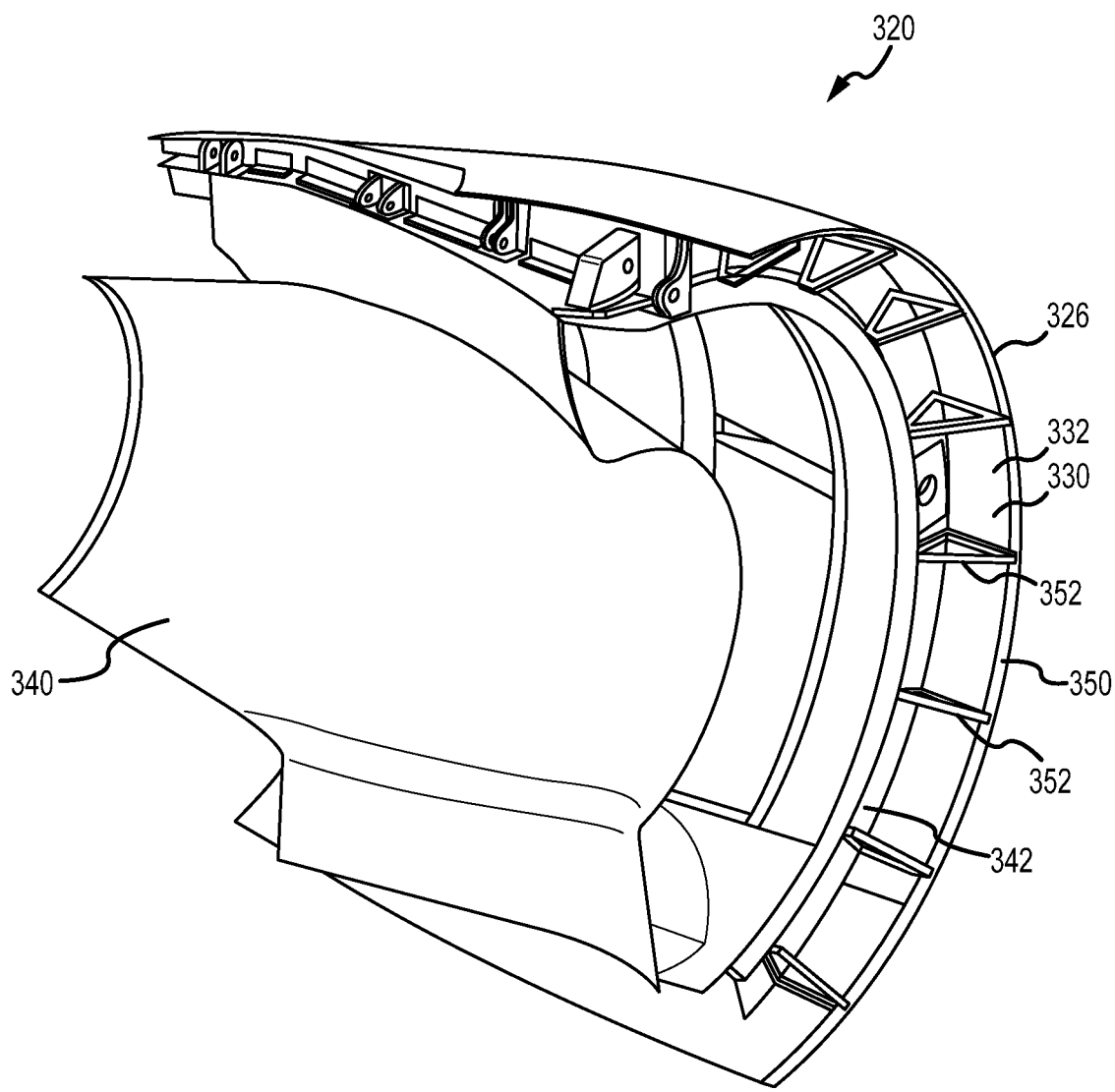
FIG. 3B illustrates a perspective view of the thrust reverser of FIG. 3A, in accordance with various embodiments.

With reference to FIG. 3B, a perspective view of thrust reverser 320 with pivot door 330 in the stowed position is illustrated, in accordance with various embodiments. Attachment features 352 may be circumferentially disposed along torque box 342. Support ring 350 may surround attachment features 352. In this manner, pivot door outer skin 332 may overlap half of support ring 350 and fan cowl 312 may overlap the remaining half of support ring 350, with momentary reference to FIG. 3A. Support ring 350 may be located radially outward from a fan case (e.g., fan case 132 of FIG. 1) and axially in line with or overlapping the fan case. In this manner, forward lip 326 may overlap the fan case by a dimension (e.g., dimension 228 of FIG. 2A). Thrust reverser 320 may further include inner fixed structure 340.

Figure 3C:
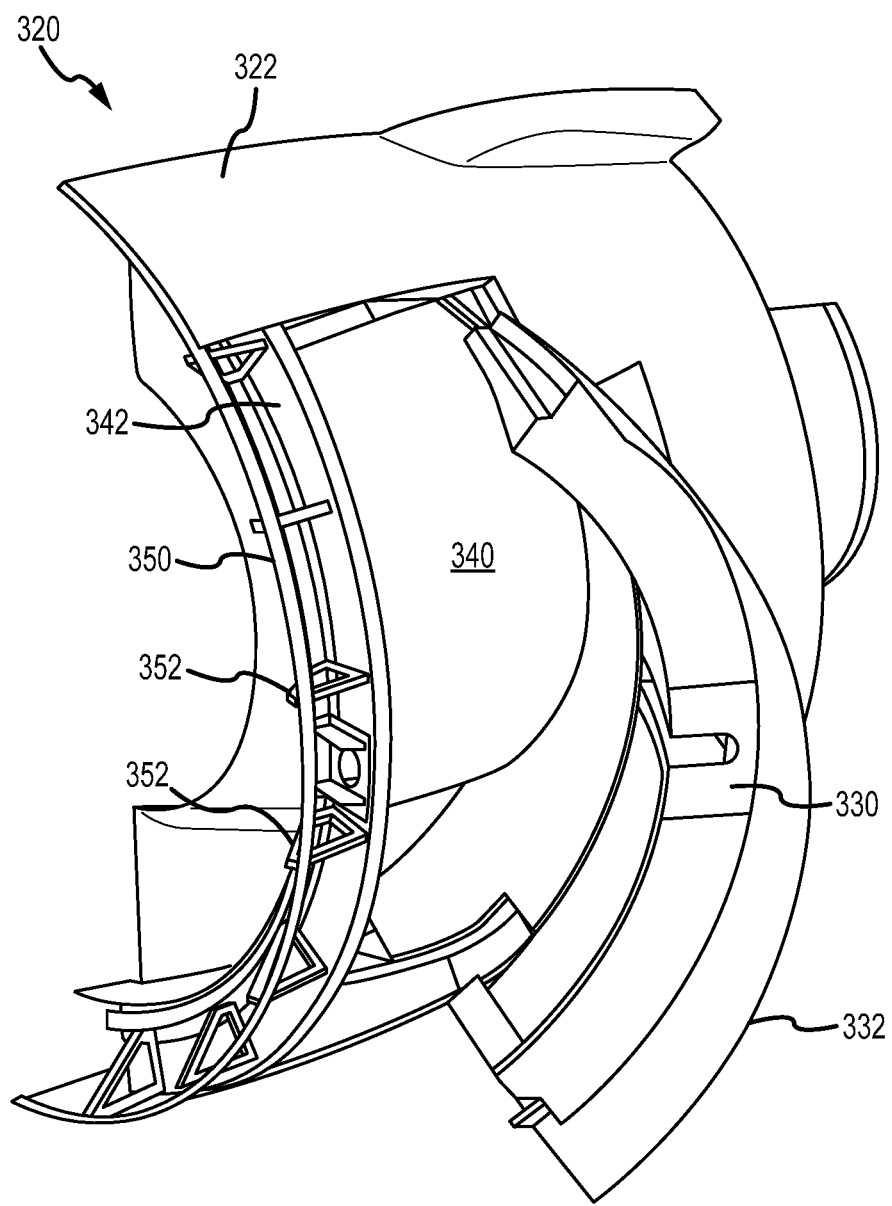
FIG. 3C illustrates a perspective view of the thrust reverser of FIG. 3B with the pivot door in a deployed position, in accordance with various embodiments.

With respect to FIG. 3C, elements with like element numbering, as depicted in FIG. 3A and FIG. 3B, are intended to be the same and will not necessarily be repeated for the sake of clarity.

With reference to FIG. 3C, a perspective view of thrust reverser 320 with pivot door 330 in a deployed position is illustrated, in accordance with various embodiments. In FIG. 3C, the actuator is omitted for clarity purposes. Forward lip 326 may extend over approximately half of support ring 350. Thrust reverser outer skin 322 may overlap half of support ring 350 and fan cowl 312 may overlap the remaining half of support ring 350, with momentary reference to FIG. 3A.

Figure 4:
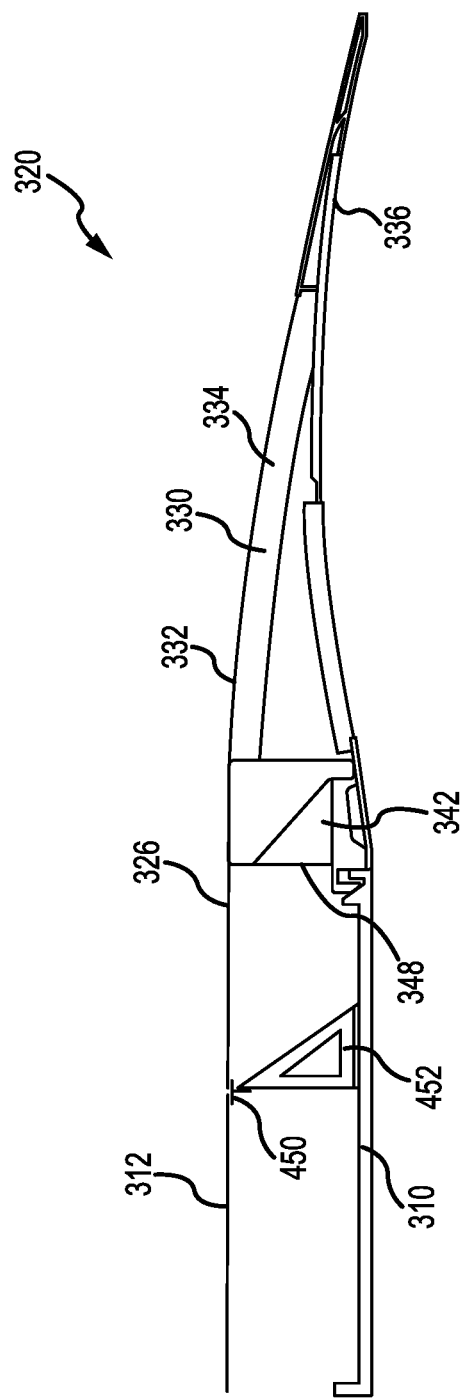
FIG. 4 illustrates a cross-section view of a thrust reverser having a support ring coupled to a fan case, with the pivot door in a stowed position, in accordance with various embodiments.

With reference to FIG. 4, support ring 450 may alternatively be supported on fan case 310. In various embodiments, support ring 350 may be similar to support ring 450, with momentary reference to FIG. 3A. In this regard, a series of radially arranged brackets 452 may be coupled to fan case 310. Support ring 450 may be coupled to brackets 452. It is contemplated herein that brackets 452 and support ring 450 may comprise a single, monolithic piece. The forward side of torque box 342 may be coupled to the aft side of fan case 310.

Although having described various embodiments of a thrust reverser having two pivot doors, it is contemplated that the present disclosure, as described herein, may also be useful for thrust reversers having any number of pivot doors, such as four pivot doors for example. For example, a thrust reverser may have two thrust reverser halves, each half having two pivot doors.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A thrust reverser for a nacelle comprising a fan cowl configured to surround a fan case, the thrust reverser comprising:
 an inner fixed structure;
 an outer fixed structure comprising a thrust reverser outer skin;
 a bypass duct disposed between the inner fixed structure and the outer fixed structure;
 a torque box disposed at a forward end of the thrust reverser;
 a support ring disposed forward of the torque box, wherein the support ring is axially spaced apart from the torque box;
 a bracket configured to be coupled to the fan case independent of the torque box, wherein the support ring is configured to be supported by the bracket; and
 a pivot door mounted on the outer fixed structure for pivotal movement with respect to the outer fixed structure between a stowed and a deployed position, the pivot door comprising:
 a support structure; and
 a pivot door outer skin coupled to the support structure;
 wherein a forward lip of the pivot door outer skin is configured to extend forward of a forwardmost end of the torque box when the thrust reverser pivot door is in a stowed position, and the forward lip is supported by the support ring when the thrust reverser pivot door is in the stowed position.

2. The thrust reverser pivot door of claim 1, wherein the forward lip of the pivot door outer skin is configured to be flush with a fan cowl when the thrust reverser pivot door is in the stowed position.

3. The thrust reverser of claim 2, wherein the forward lip of the pivot door outer skin is disposed aft of an aft lip of the fan cowl.

4. The thrust reverser of claim 2, wherein an aft edge of the fan cowl lands upon the support ring.

5. The thrust reverser of claim 1, wherein the pivot door outer skin is configured to pivot with the support structure.

6. The thrust reverser of claim 1, wherein the bracket extends past, in a forward direction, a forward surface of the torque box.

7. A nacelle, comprising:
 a fan cowl configured to surround a fan case;
 a thrust reverser disposed aft of the fan cowl, the thrust reverser comprising:
 an inner fixed structure;
 an outer fixed structure comprising a thrust reverser outer skin;
 a bypass duct disposed between the inner fixed structure and the outer fixed structure;
 a torque box disposed at a forward end of the thrust reverser;
 a support ring disposed forward of the torque box, wherein the support ring is axially spaced apart from the torque box;
 a bracket attached to the fan case independent of the torque box, wherein the support ring is supported by the bracket; and
 a thrust reverser pivot door, comprising a pivot door outer skin having a forward lip overlapping the fan case,
 wherein the thrust reverser pivot door is configured to pivot between a stowed position and a deployed position,
 the forward lip is supported by the support ring when the thrust reverser pivot door is in the stowed position, and
 the forward lip of the pivot door outer skin extends in a forward direction past a forwardmost end of the torque box when the thrust reverser pivot door is in the stowed position.

8. The nacelle of claim 7, wherein the support ring is disposed radially outward from and axially in line with the fan case.

9. The nacelle of claim 7, wherein the forward lip of the pivot door outer skin is disposed aft of an aft lip of the fan cowl.

* * * * *